United States Patent
Ho

(10) Patent No.: US 9,296,542 B2
(45) Date of Patent: Mar. 29, 2016

(54) VACUUM STORAGE CONTAINER

(71) Applicant: Shin Hung Yih Technology Co., Ltd., Taipei (TW)

(72) Inventor: Yi-Hung Ho, Taipei (TW)

(73) Assignee: SHIN HUNG YIH TECHNOLOGY CO. LTD., Taipei (TW)

( * ) Notice: Subject to any disclaimer, the term of this patent is extended or adjusted under 35 U.S.C. 154(b) by 169 days.

(21) Appl. No.: 14/311,539

(22) Filed: Jun. 23, 2014

(65) Prior Publication Data

US 2015/0368021 A1 Dec. 24, 2015

(51) Int. Cl.
*B65D 81/20* (2006.01)

(52) U.S. Cl.
CPC .................................. *B65D 81/2038* (2013.01)

(58) Field of Classification Search
CPC ...... B65B 31/00; B67C 3/16; B65D 81/2038; H01J 9/385
USPC ........ 141/8, 65; 206/524.8; 99/472; 312/404; 53/510
See application file for complete search history.

(56) References Cited

U.S. PATENT DOCUMENTS

| 5,201,348 | A | * | 4/1993 | Lurz | ..................... | B01L 3/5025 |
| | | | | | | 141/130 |
| 5,399,007 | A | * | 3/1995 | Marconet | ........... | A61B 19/0248 |
| | | | | | | 312/209 |
| 5,806,575 | A | * | 9/1998 | Tsay | .................. | B65D 81/2015 |
| | | | | | | 141/192 |
| 7,325,409 | B2 | * | 2/2008 | Espinosa | ................. | A47F 3/001 |
| | | | | | | 62/169 |
| 8,281,606 | B2 | * | 10/2012 | Vonderhaar | ........... | F25D 17/042 |
| | | | | | | 62/100 |

\* cited by examiner

*Primary Examiner* — Timothy L Maust
(74) *Attorney, Agent, or Firm* — Jackson IPG PLLC; Demian K. Jackson

(57) ABSTRACT

A vacuum storage container includes a container housing, a drawer mounted in the container housing and movable between a closed position and an open position, a rotary knob pivotally mounted in a door cover of the drawer, clockwork coupled to the rotary knob, a drive gear affixed to the rotary knob, a transmission gear set rotatable by the drive gear, an eccentric wheel rotatable by the transmission gear set, a pumping pump mounted in the drawer and coupled to the eccentric wheel for creating a vacuum in the container housing, an ejection mechanism adapted for ejecting the drawer out of the container housing, and an operating member control mechanism adapted for locking the drawer to the container housing and operable to unlock the drawer for enabling the drawer to be ejected out of the container housing by the ejection mechanism.

8 Claims, 20 Drawing Sheets

US 9,296,542 B2

VACUUM STORAGE CONTAINER

BACKGROUND OF THE INVENTION

1. Field of the Invention

The present invention relates to storage container technology and more particularly, to a vacuum storage container, which utilizes an external rotary knob to drive an internal pumping mechanism to create a vacuum.

2. Description of the Related Art

Conventional mechanical vacuum storage containers cannot automatically pump air out in case of a gas leakage. Further, in case of a gas leakage, a conventional electronic vacuum storage container needs to start pumping air out, bringing inconvenience.

SUMMARY OF THE INVENTION

The present invention has been accomplished under the circumstances in view. It is the main object of the present invention to provide a vacuum storage container, which achieves a high level of rotational conversion efficiency through the functioning of a drive gear, a transmission gear set and a clockwork, and allows quick creation of a vacuum by means of rotating a rotary knob over a limited number of turns to wind up a clockwork and to rotate a drive gear for driving a transmission gear set to reciprocate a pumping pump It is another object of the present invention to provide a vacuum storage container, which enables a certain degree of vacuum to be created in the container housing and the clockwork to be maintained at a preloaded status when the internal pressure is in balance with the torque of the clockwork, thus, in case of slight gas leaks, the preloaded pressure of the clockwork and the transmission gear set can maintain the internal vacuum. Therefore, when compared with the conventional electronic type vacuum storage containers that need to start pumping again in case of a gas leakage or conventional mechanism vacuum storage containers that cannot pump air out automatically, the invention exhibits superior performances.

It is another object of the present invention to provide a vacuum storage container, which enables the container housing to discharge pressure and the drawer to be immediately and automatically ejected out of the container housing by the ejection mechanism when an operating member control mechanism thereof is pressed, and thus the invention has the characteristic of ease of use.

It is still another object of the present invention to provide a vacuum storage container, which allows any of a variety of different types of inner boxes to be selectively and detachably placed in the drawer for keeping things, and the loaded inner box can be conveniently taken out of the container housing for washing.

It is still another object of the present invention to provide a vacuum storage container, which allows multiple vacuum storage containers to be arranged in a stack or in multiple stacks for storing things in a vacuum condition.

DETAILED DESCRIPTION OF THE INVENTION

Figure 1:
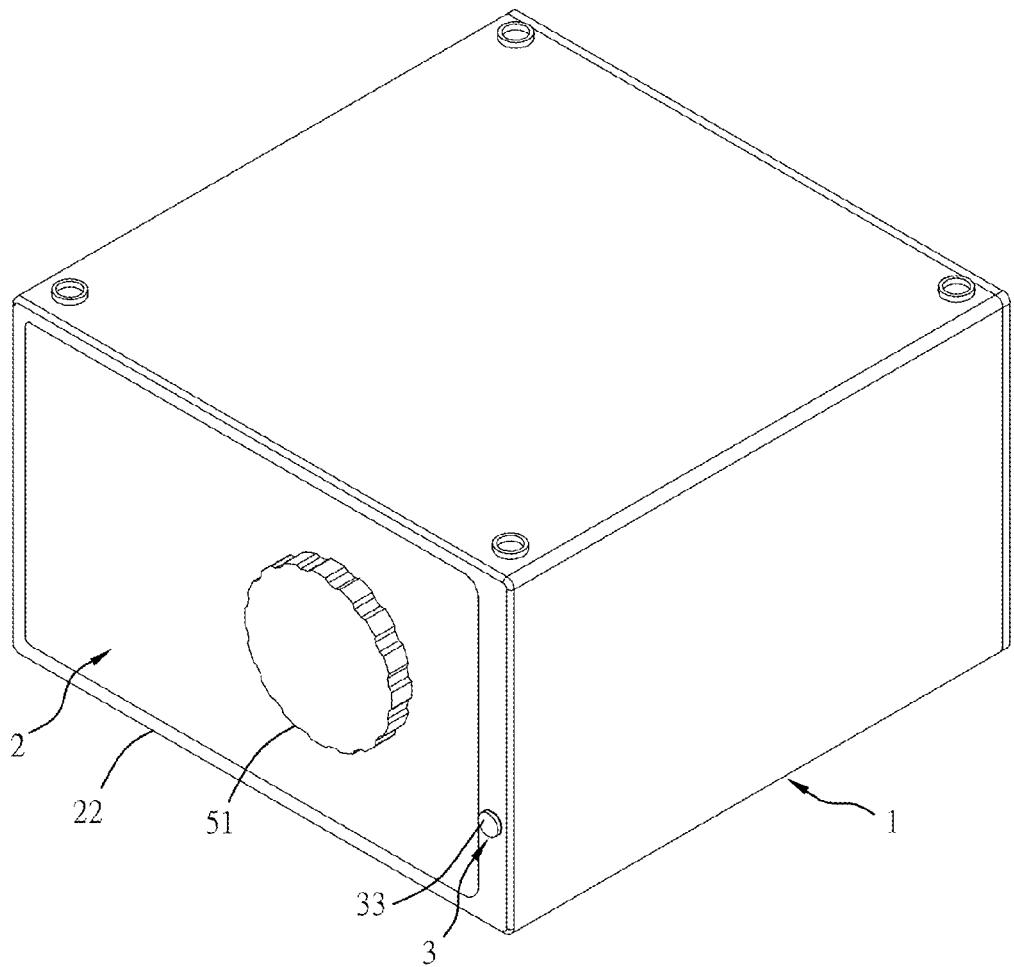
FIG. 1 is an oblique top elevational view of a vacuum storage container in accordance with the present invention.
Figure 2:
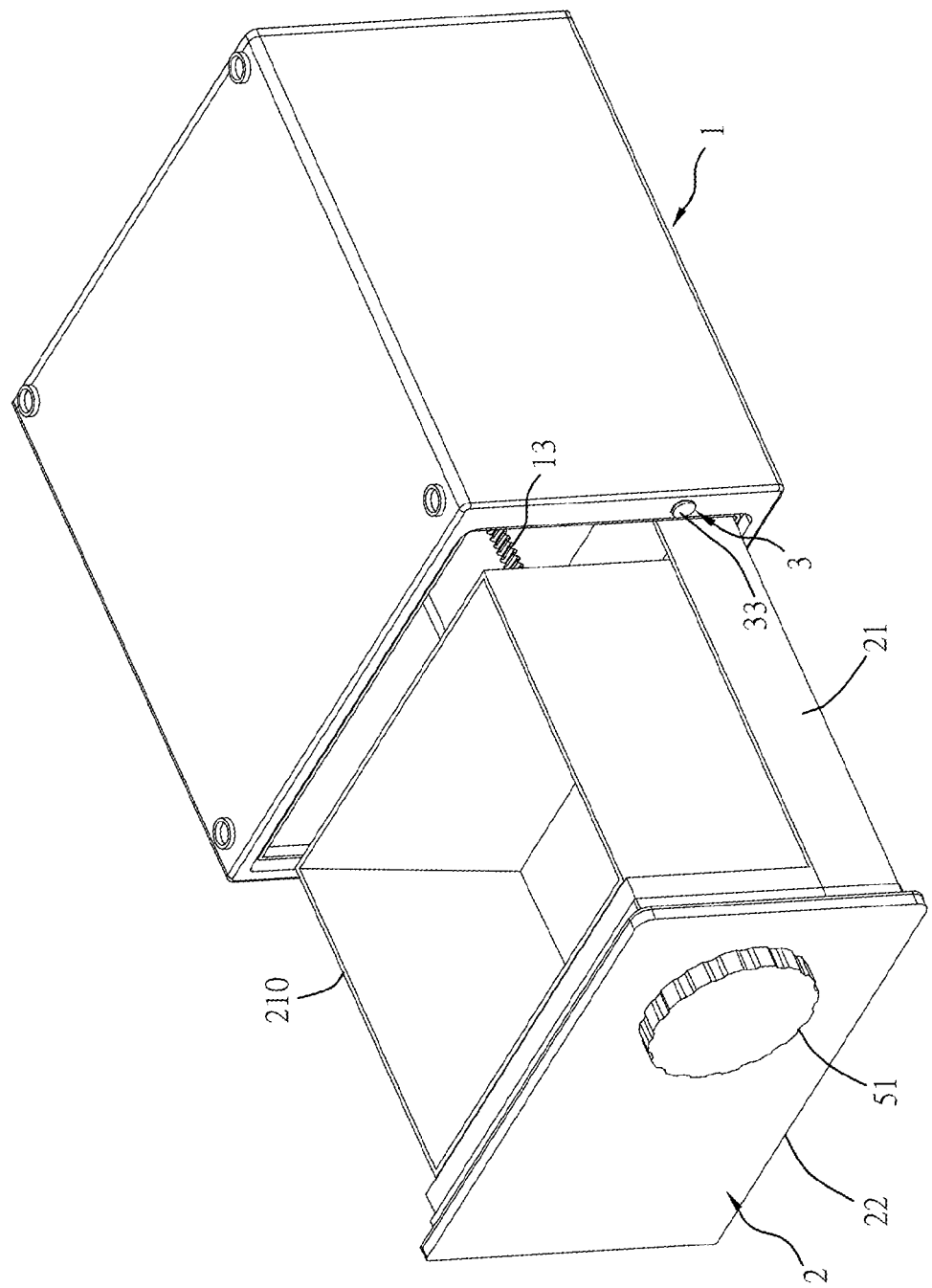
FIG. 2 corresponds to FIG. 1, illustrating the drawer opened.
Figure 3:
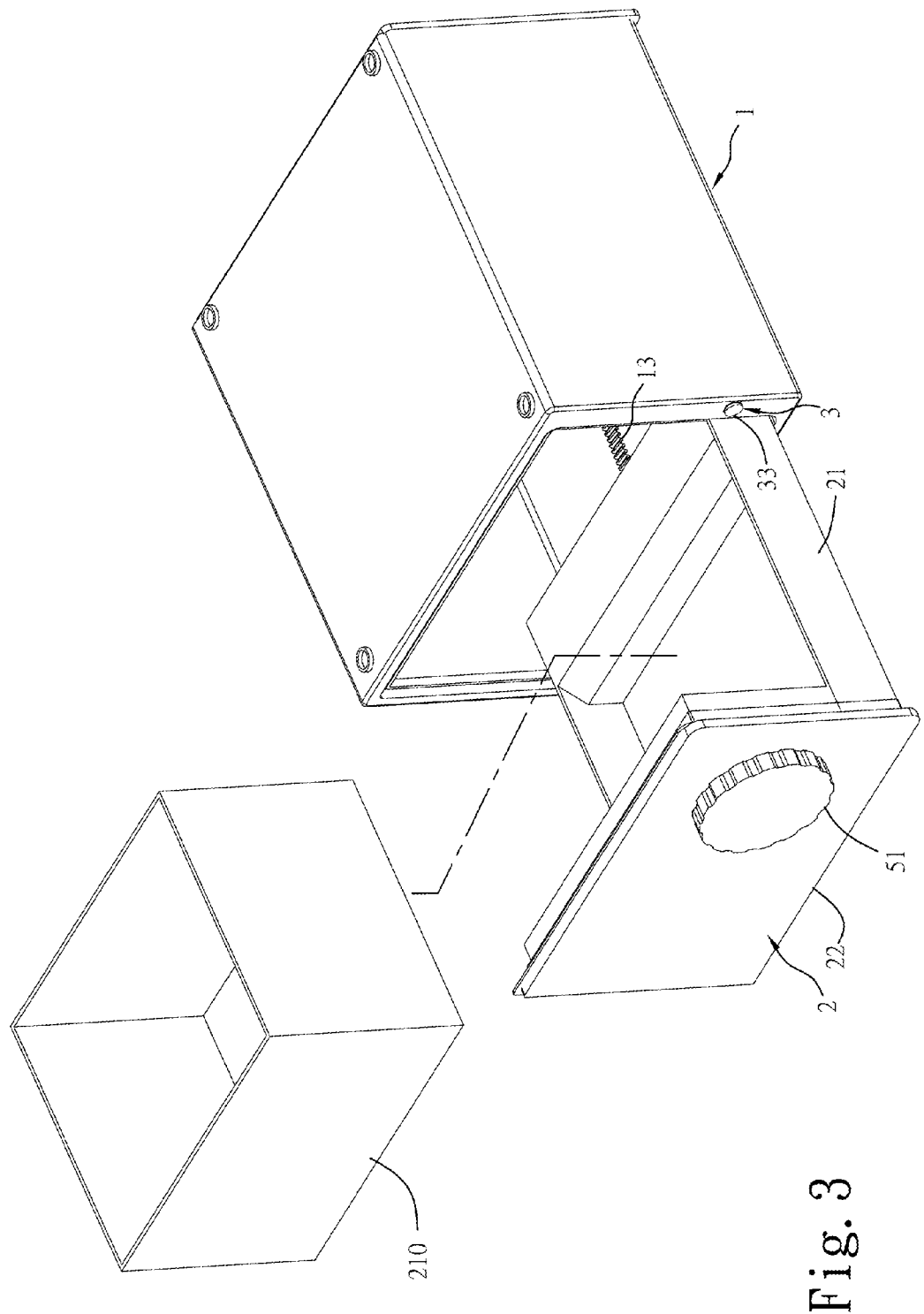
FIG. 3 corresponds to FIG. 2, illustrating the inner box taken out of the drawer.
Figure 4:
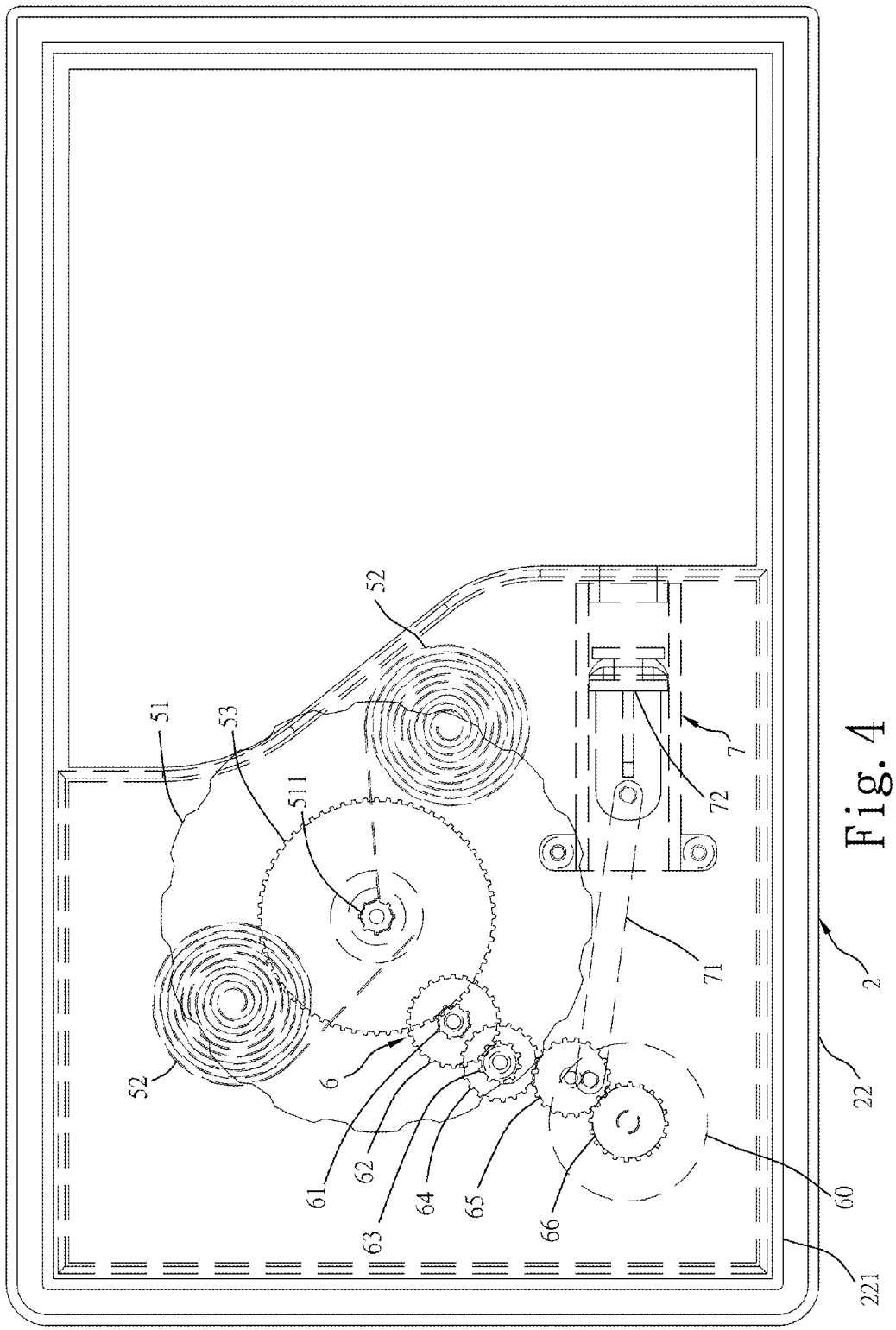
FIG. 4 is a schematic plain rear view of the present invention, illustrating the arrangement of the internal component parts in the back cover of the drawer.
Figure 5:
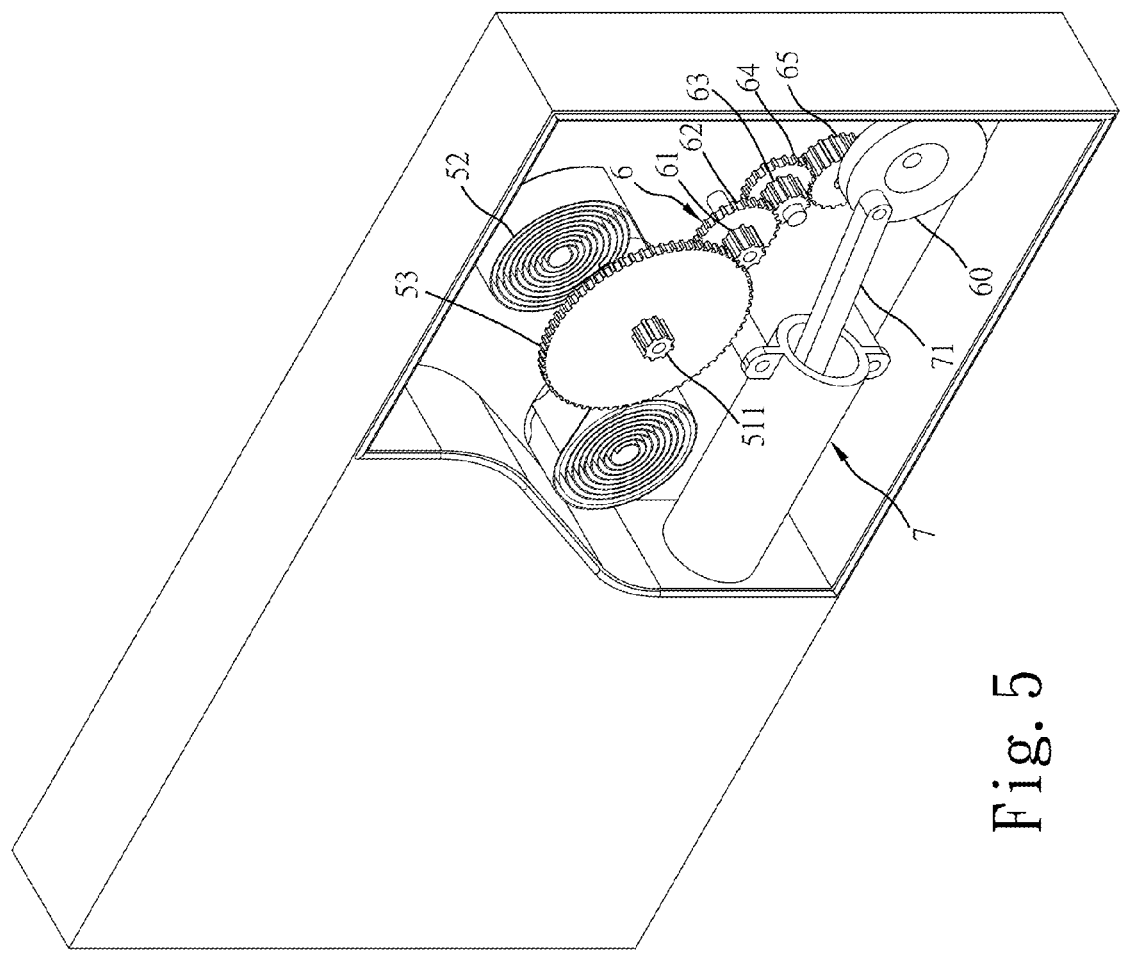
FIG. 5 is a cutaway view of the back cover of the drawer of the vacuum storage container in accordance with the present invention.
Figure 6:
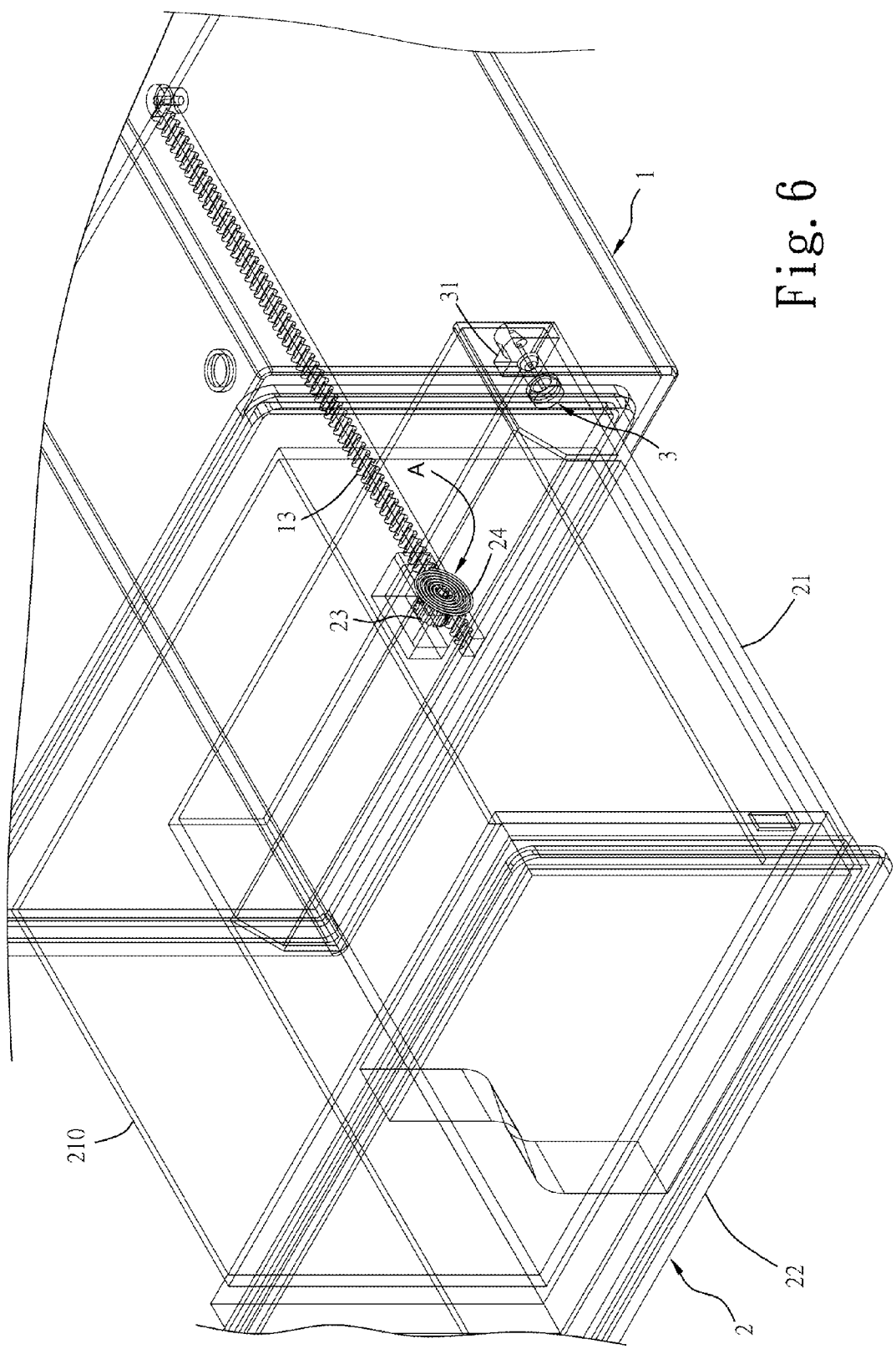
FIG. 6 is a perspective view of a part of the present invention, illustrating the drawer opened.
Figure 7:
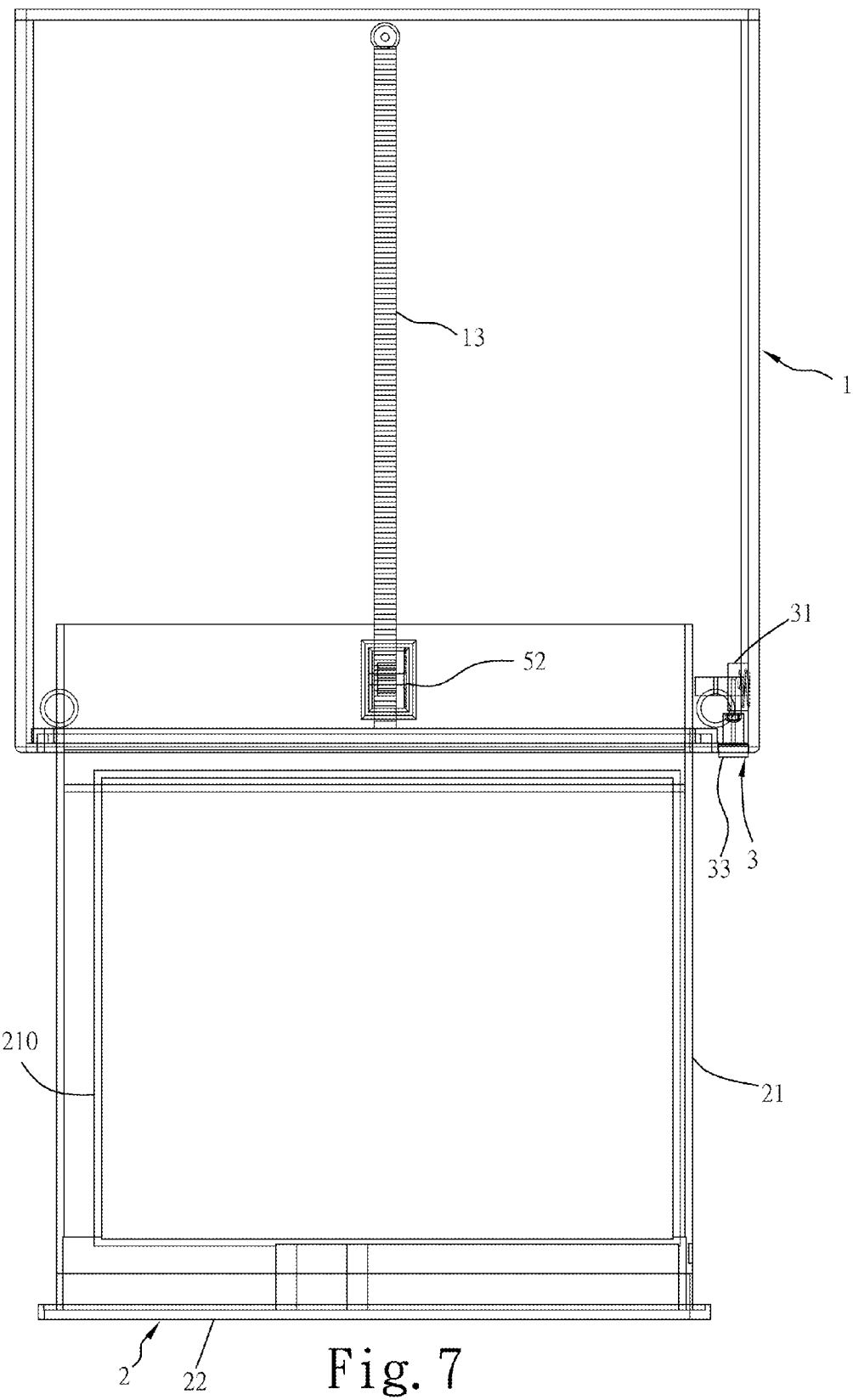
FIG. 7 is a top view of FIG. 6.
Figure 8:
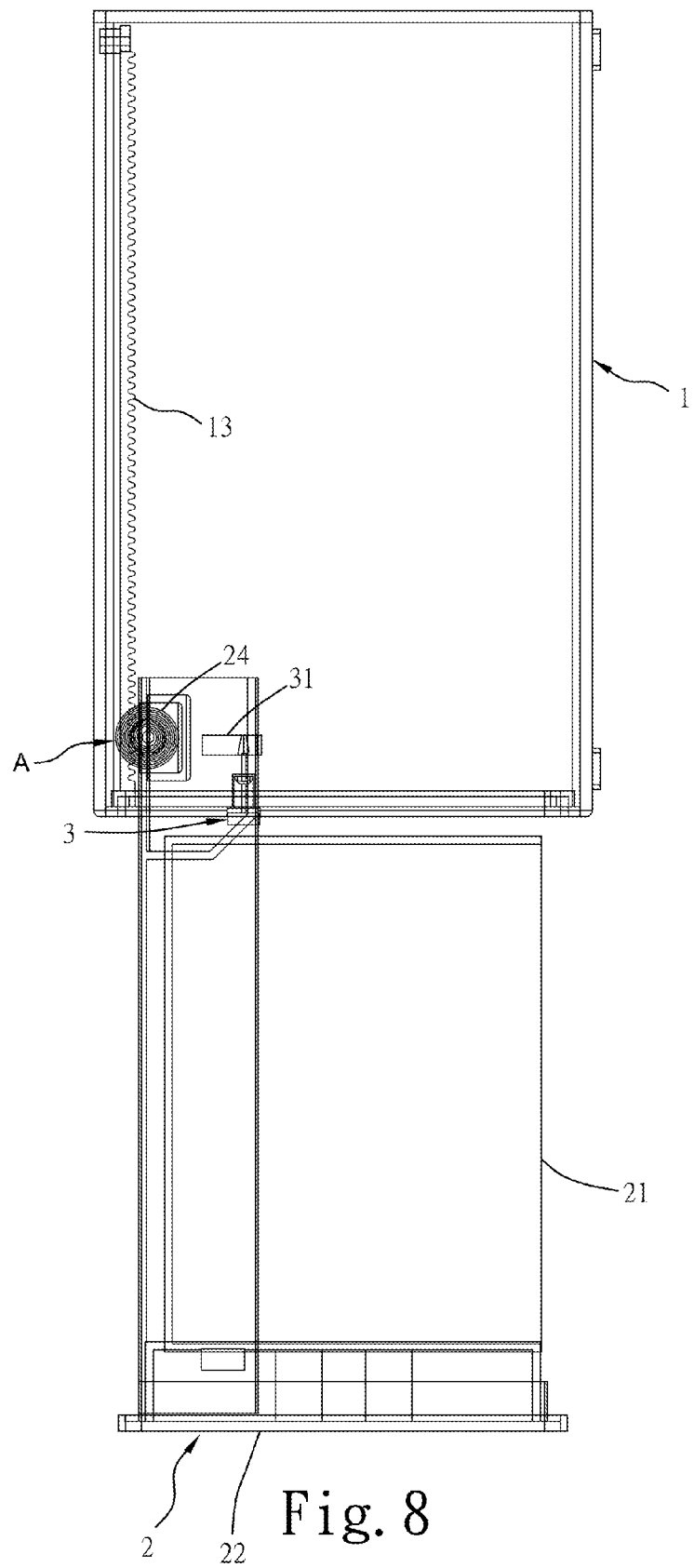
FIG. 8 is a side view of FIG. 6.
Figure 9:
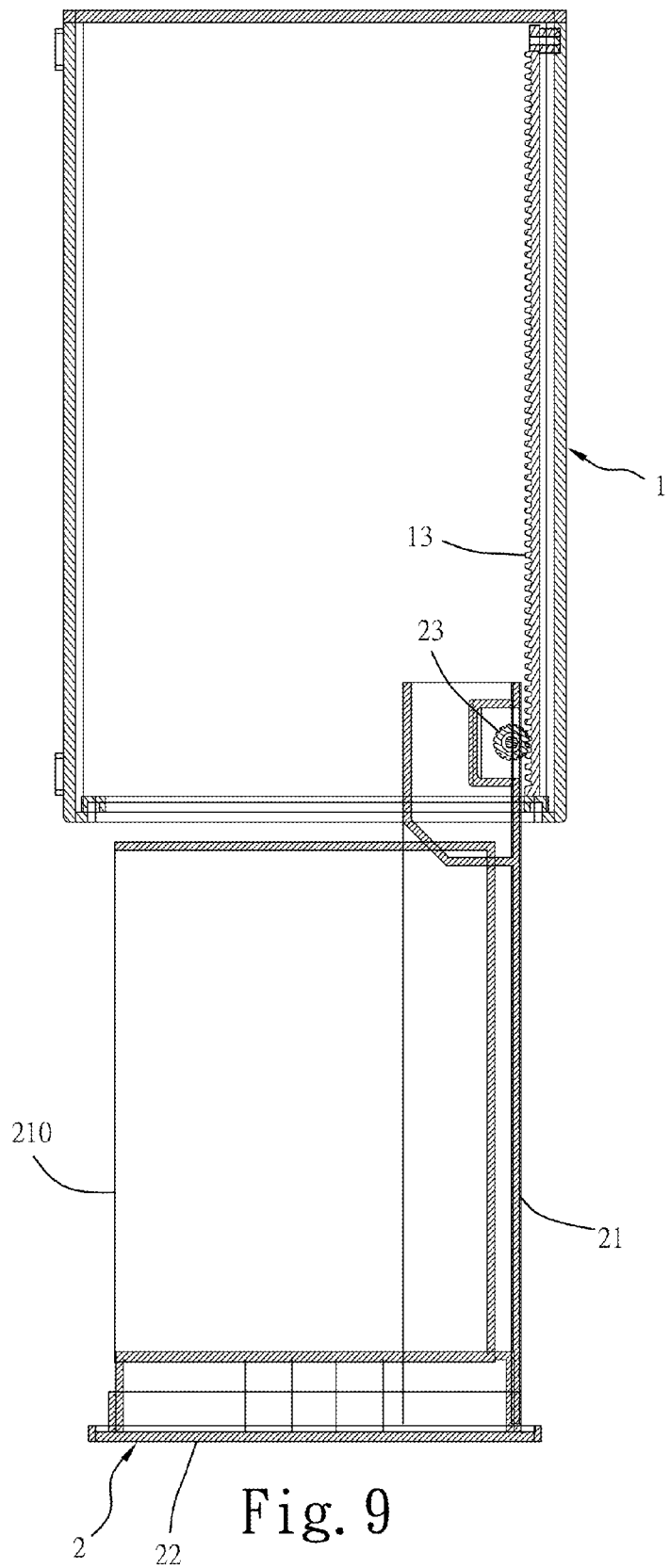
FIG. 9 is a schematic sectional side view of the present invention, illustrating the drawer opened.
Figure 10:
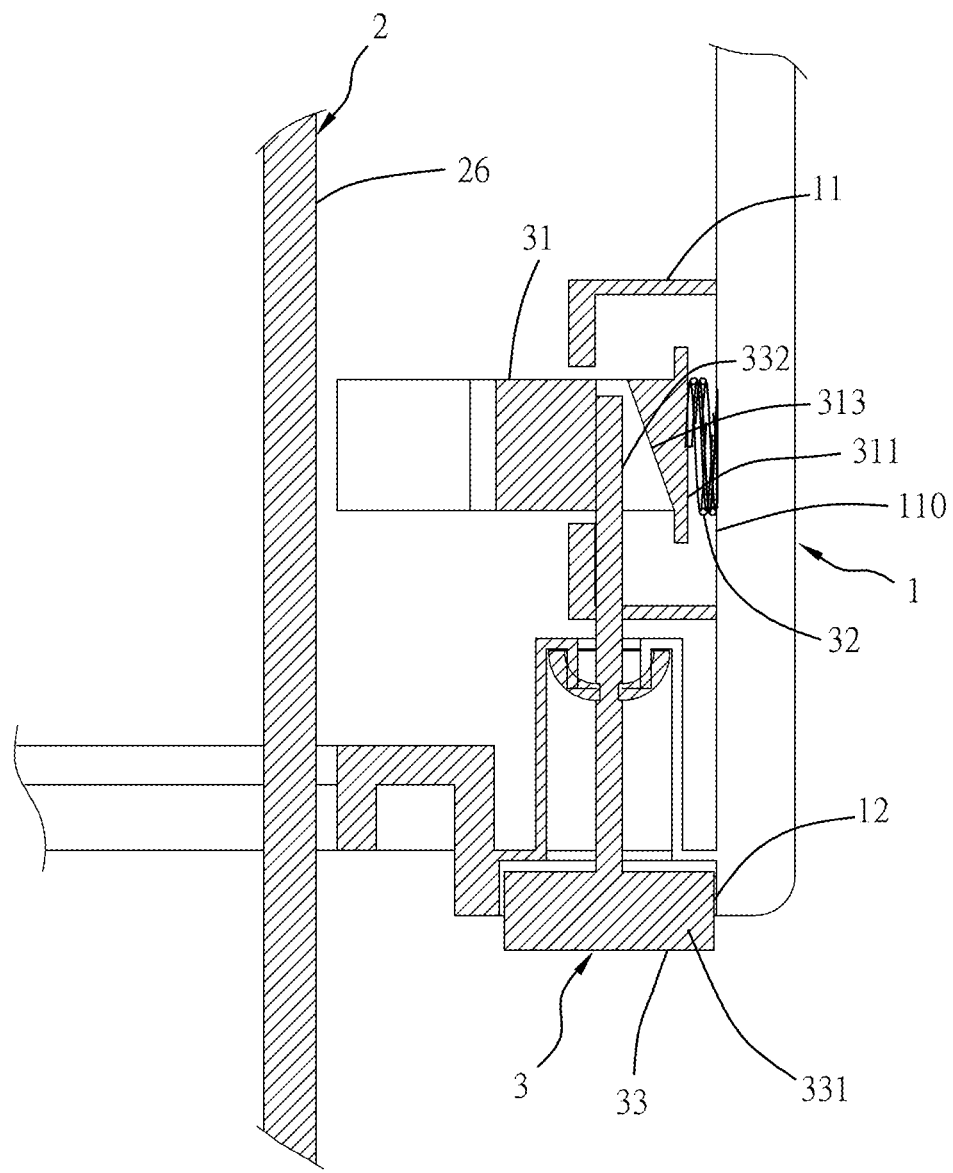
FIG. 10 is a sectional view in an enlarged scale of a part of the present invention, illustrating the arrangement of the operating member control mechanism.
Figure 11:
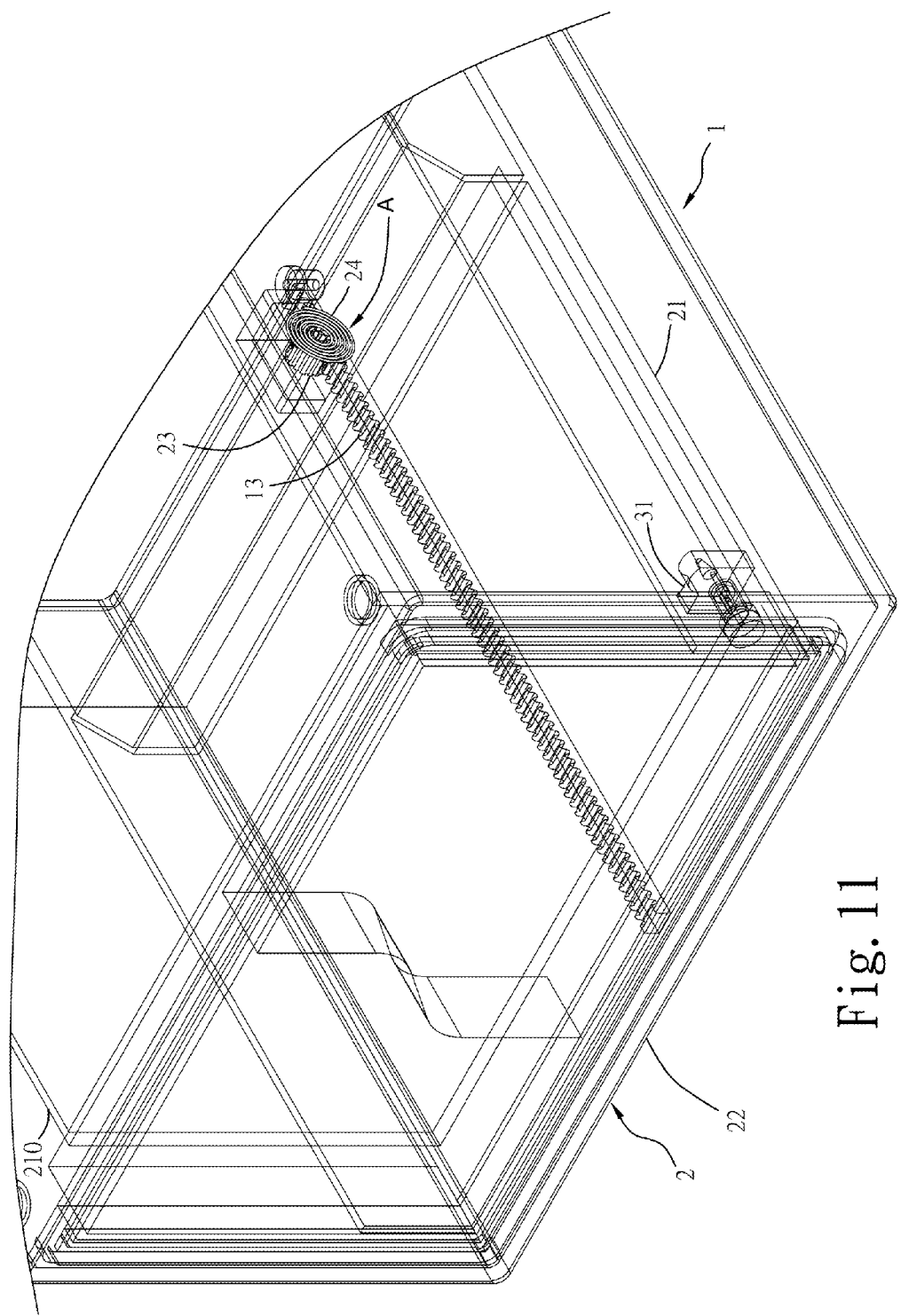
FIG. 11 is a perspective view of a part of the present invention, illustrating the drawer closed.
Figure 12:
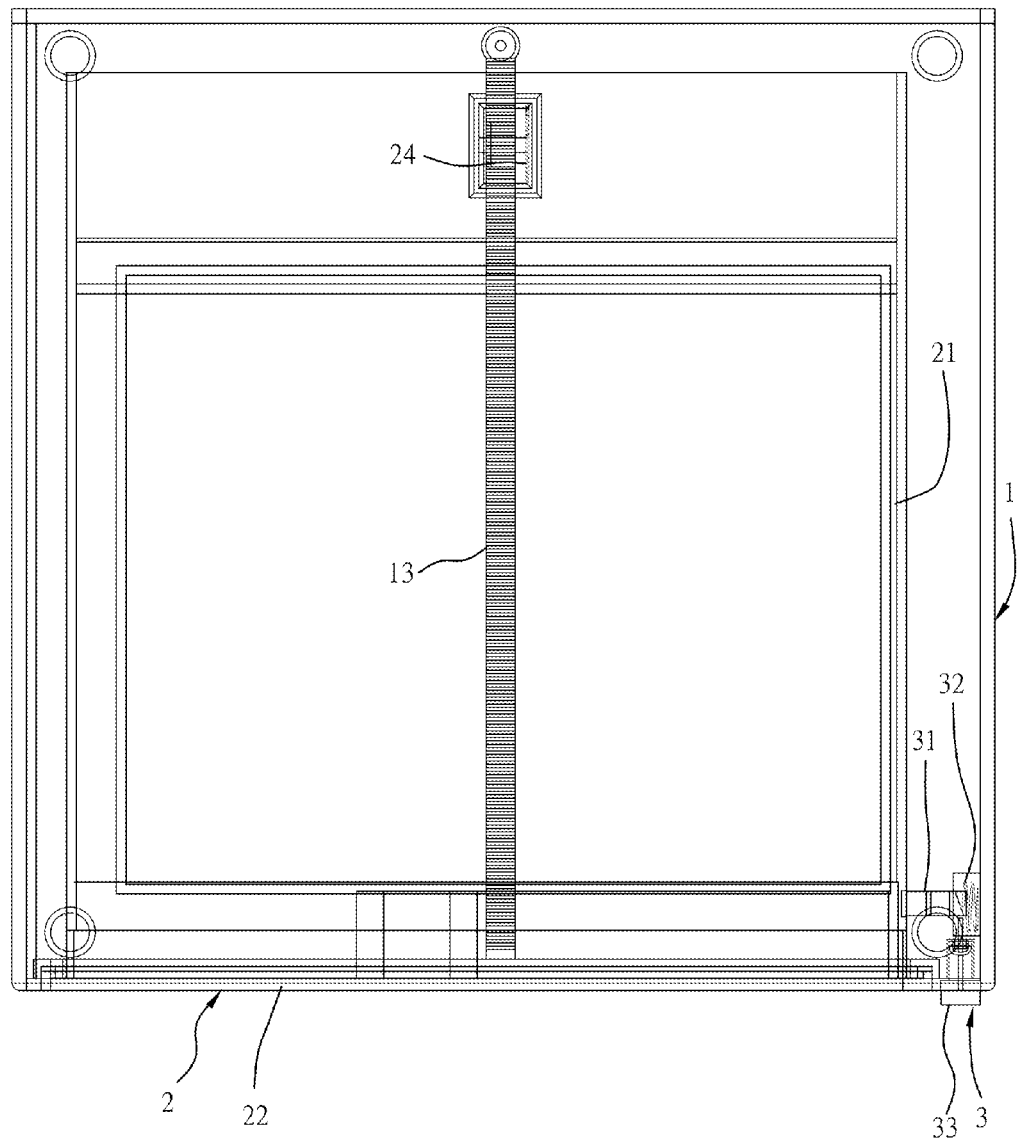
FIG. 12 is a schematic plain top view of the present invention, illustrating the drawer closed.
Figure 13:
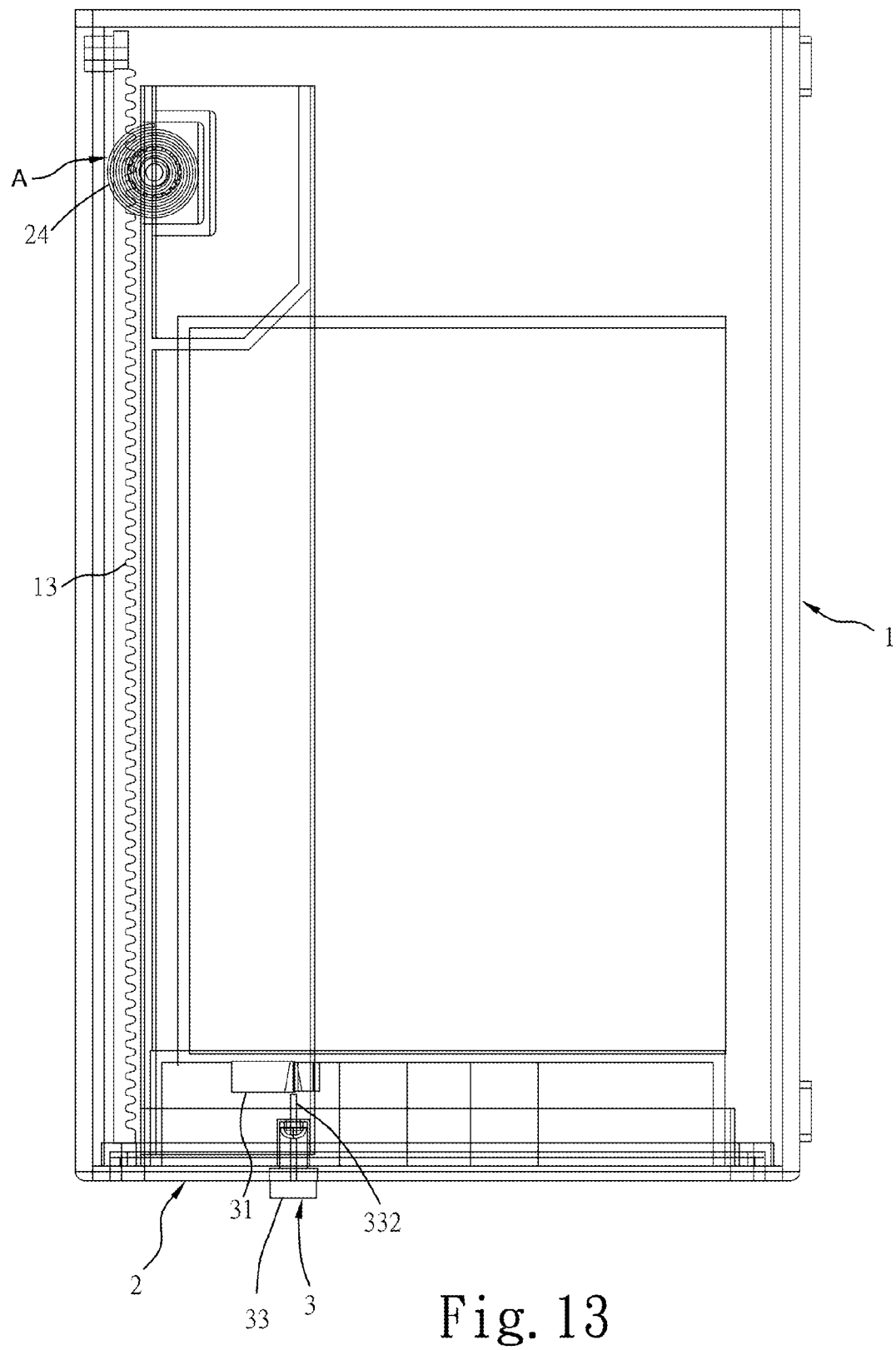
FIG. 13 is a schematic plain side view of the present invention, illustrating the drawer closed.
Figure 14:
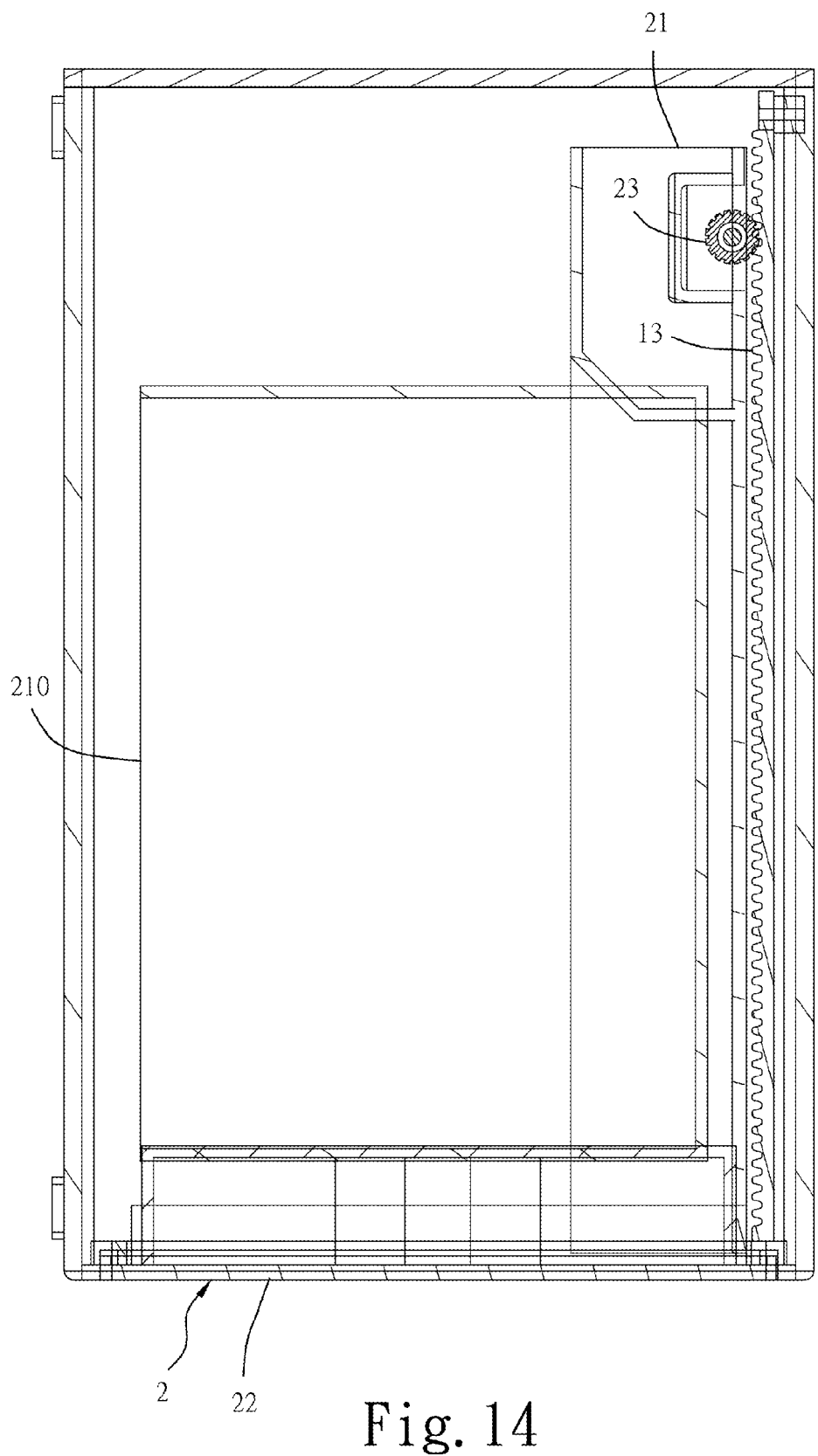
FIG. 14 is a schematic sectional side view of the present invention, illustrating the drawer closed.

Referring to FIGS. 1-15, a vacuum storage container in accordance with the present invention is shown. The vacuum storage container comprises a container housing 1 and a drawer 2.

The container housing 1 is configured for accommodating a drawer 2, enabling the accommodated drawer 2 to be moved in and out between a closed position and an open position. The container housing 1 comprises an operating member control mechanism 3 for locking the drawer 2, for enabling the drawer 2 to be automatically ejected out from the closed position to the open position by an ejection mechanism A (see FIGS. 6-9 and FIGS. 11-14).

The drawer 2 comprises a drawer body 21 slidably inserted into the container housing 1 (see FIG. 2 and FIG. 3), a door cover 22 located at a front side of the drawer body 21, a rotary knob 51 pivotally mounted in an outer side of the door cover 22 and having a center shaft 511(see FIG. 4) inserted through the door cover 22, a clockwork 52 (see FIG. 4 and FIG. 5) mounted in the door cover 22 and arranged to be wound up by the center shaft 511 of the rotary knob 51, a drive gear 53 fixedly mounted on the shaft 511 of the rotary knob 51, a transmission gear set 6 coupled to and rotatable by the drive gear 53, an eccentric wheel 60 rotatable by the transmission gear set 6, and a pumping pump 7 mounted in the door cover 22 and coupled to the eccentric wheel 60. The pumping pump 7 comprises a pumping rod 71 eccentrically coupled to the eccentric wheel 60, and a pumping piston 72 pivotally connected to one end of the pumping rod 71 opposite to the eccentric wheel 60 and slidably mounted inside the pumping pump 7.

Thus, rotating the rotary knob 51 through a number of turns can wind up the clockwork 52. As soon as the user releases the hand from the rotary knob 51 after the clockwork 52 has been wound up, the drive gear 53 is rotated to drive the transmission gear set 6, thereby reciprocating the pumping rod 71 and the pumping piston 72 dozens to hundreds of times to draw air out of the vacuum storage container and to create a vacuum state. When the internal pressure is in balance with the torque of the clockwork 52, a certain degree of vacuum is created in the container housing 1, and the clockwork 52 is maintained at a preloaded status, thus, in case of slight gas leaks, the preloaded pressure of the clockwork 52 and the transmission gear set 6 can maintain the internal vacuum. When compared with the conventional electronic type vacuum storage containers that need to start pumping again in case of a gas leakage or conventional mechanism vacuum storage containers that cannot pump air out automatically, the invention exhibits superior performances.

The aforesaid operating member control mechanism 3 (see FIG. 6, FIG. 10, FIG. 11 and FIG. 15) comprises a latch 31, a spring member 32, and an operating member The latch 31 (see FIG. 10 and FIG. 15) is movably mounted in an accommodation chamber 11 inside the container housing 1, having one end 311 thereof stopped against the spring member 32 and an opposite end 312 thereof movable in and out of the accommodation chamber 11 to stop against or disengage from one sidewall 26 of the drawer 2. The latch 31 further comprises a linking groove 313 coupled to and movable by the operating member 33. The spring member 32 is mounted in the accommodation chamber 11 inside the container housing 1 with one end thereof stopped against the latch 31 to impart a pressure to the latch 31. The opposite end of the spring member 32 is stopped against an inside wall 110 of the container housing 1 that faces toward the accommodation chamber 11 (see FIG. 10). The operating member 33 is movably mounted in a locating groove 12 at a front side of the container housing 1 (see FIG. 10 and FIG. 15), comprising an operating head 331 (see FIG. 10 and FIG. 15) and an actuation shank 332 backwardly extended from the operating head 331. Thus, pressing the operating member 33 can move the actuation shank 332 into the linking groove 313 of the latch 31, driving the latch 31 to release the opposite end 312 from the drawer 2.

Figure 15:
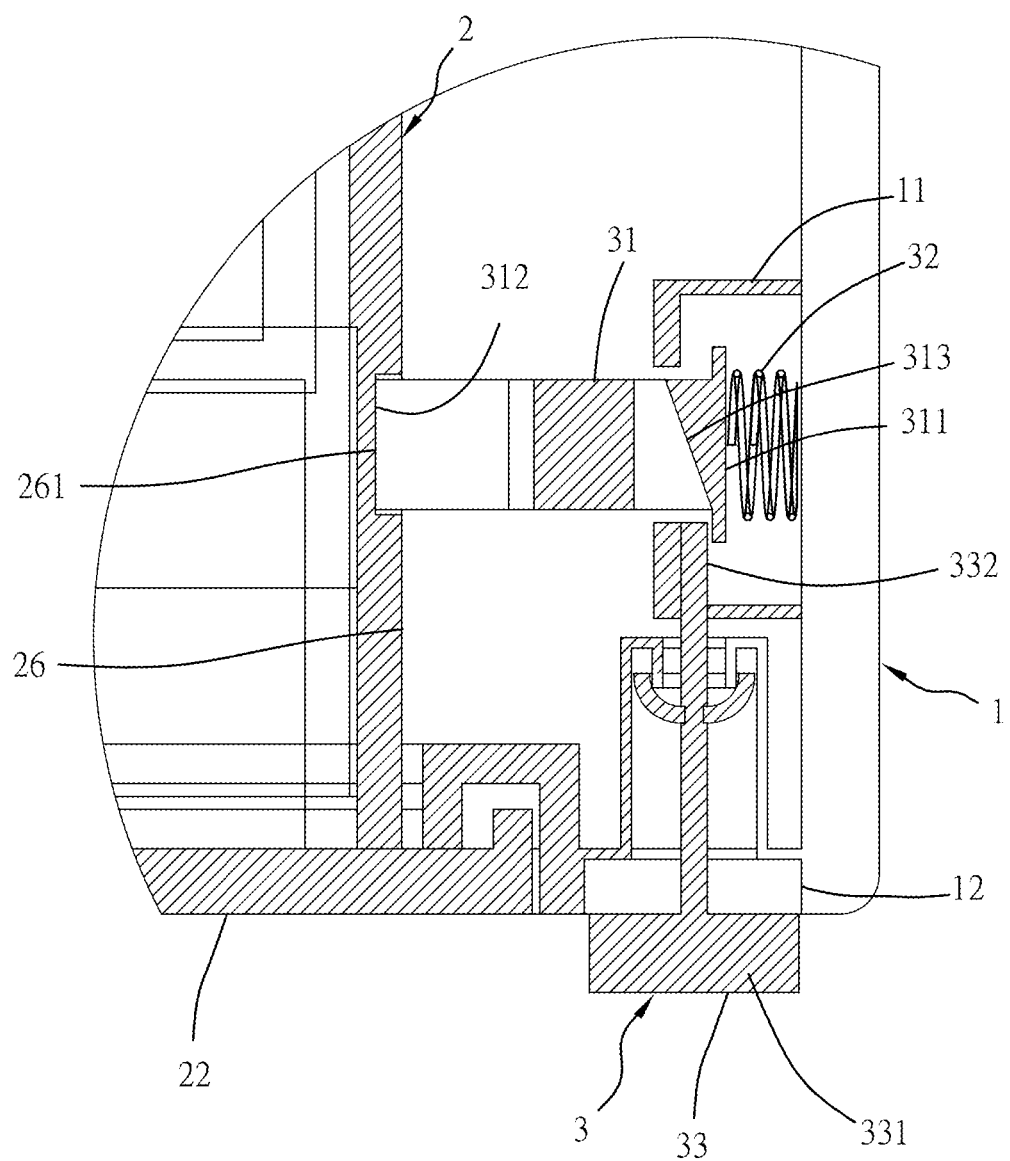
FIG. 15 is a schematic sectional view of a part of the present invention, illustrating the latch of the operating member control mechanism engaged into the drawer.
Figure 16:
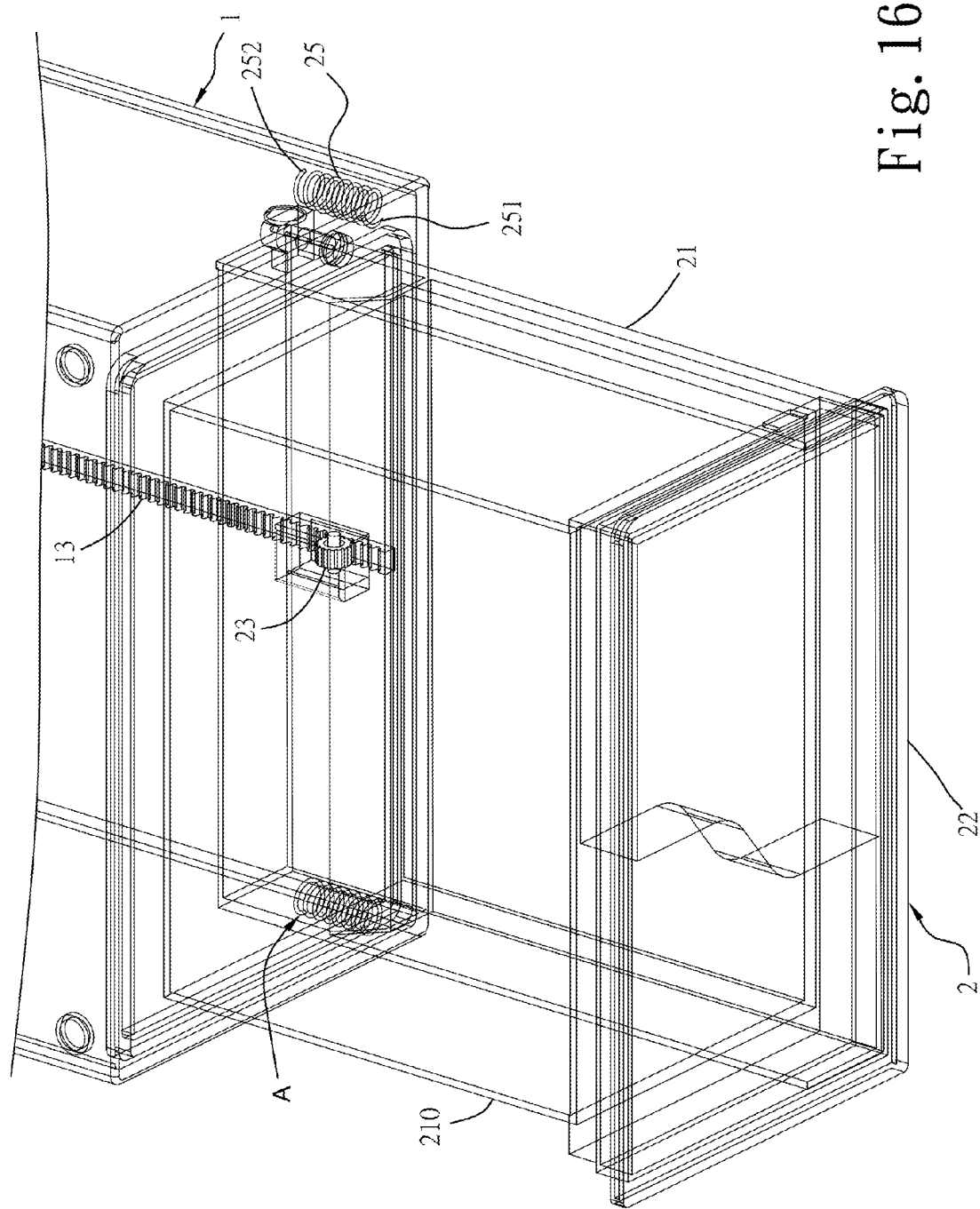
FIG. 16 is a perspective view of an alternate form of the present invention, illustrating two tensile springs used to substitute for the ejector clockwork.
Figure 17:
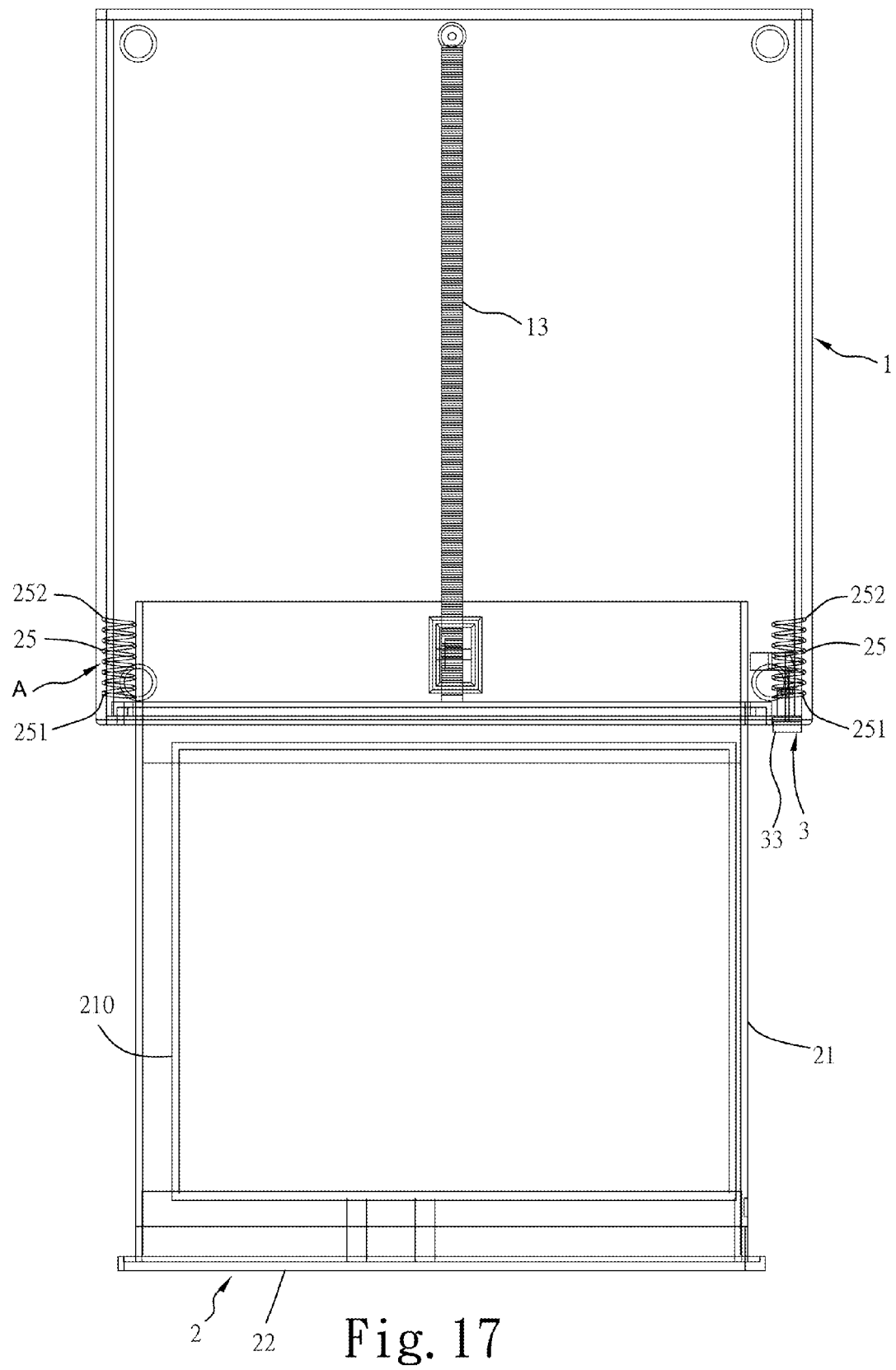
FIG. 17 is a schematic plain top view of FIG. 16.
Figure 18:
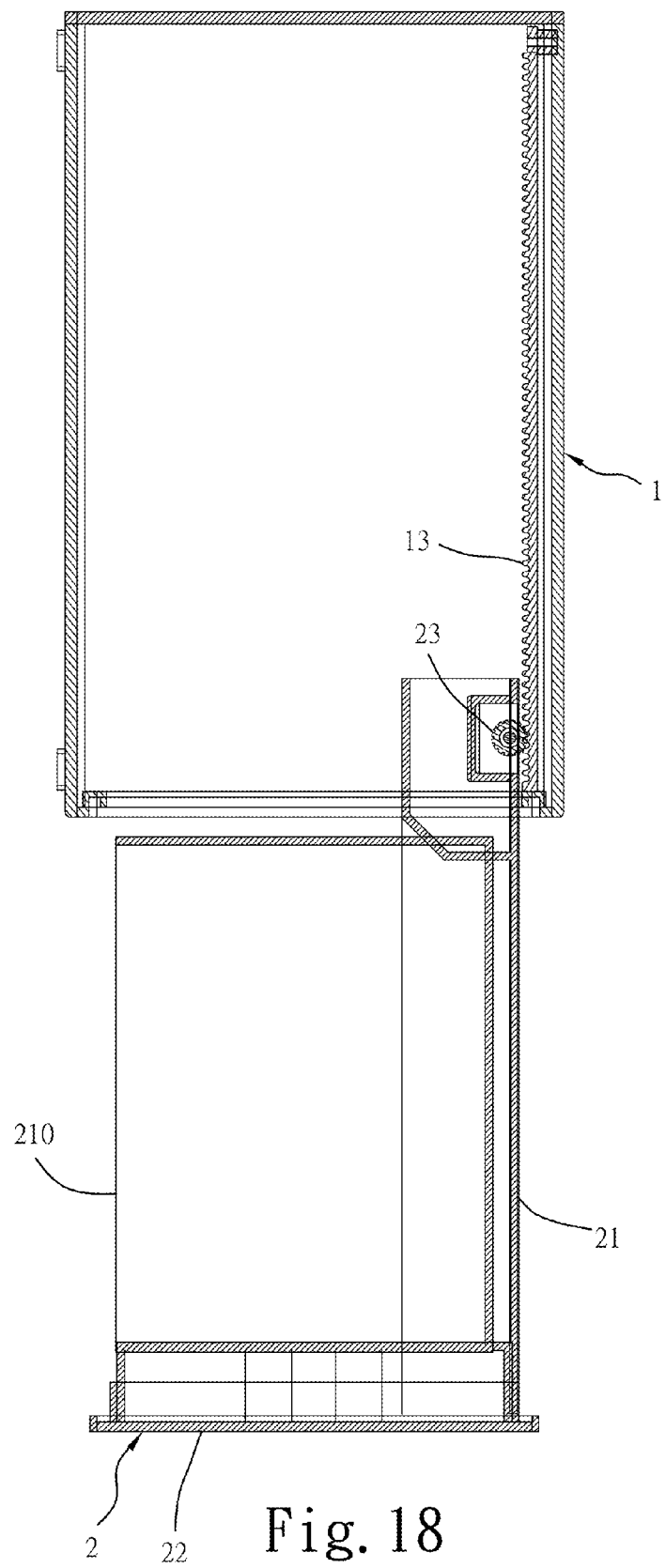
FIG. 18 is a schematic sectional view of FIG. 16.
Figure 19:
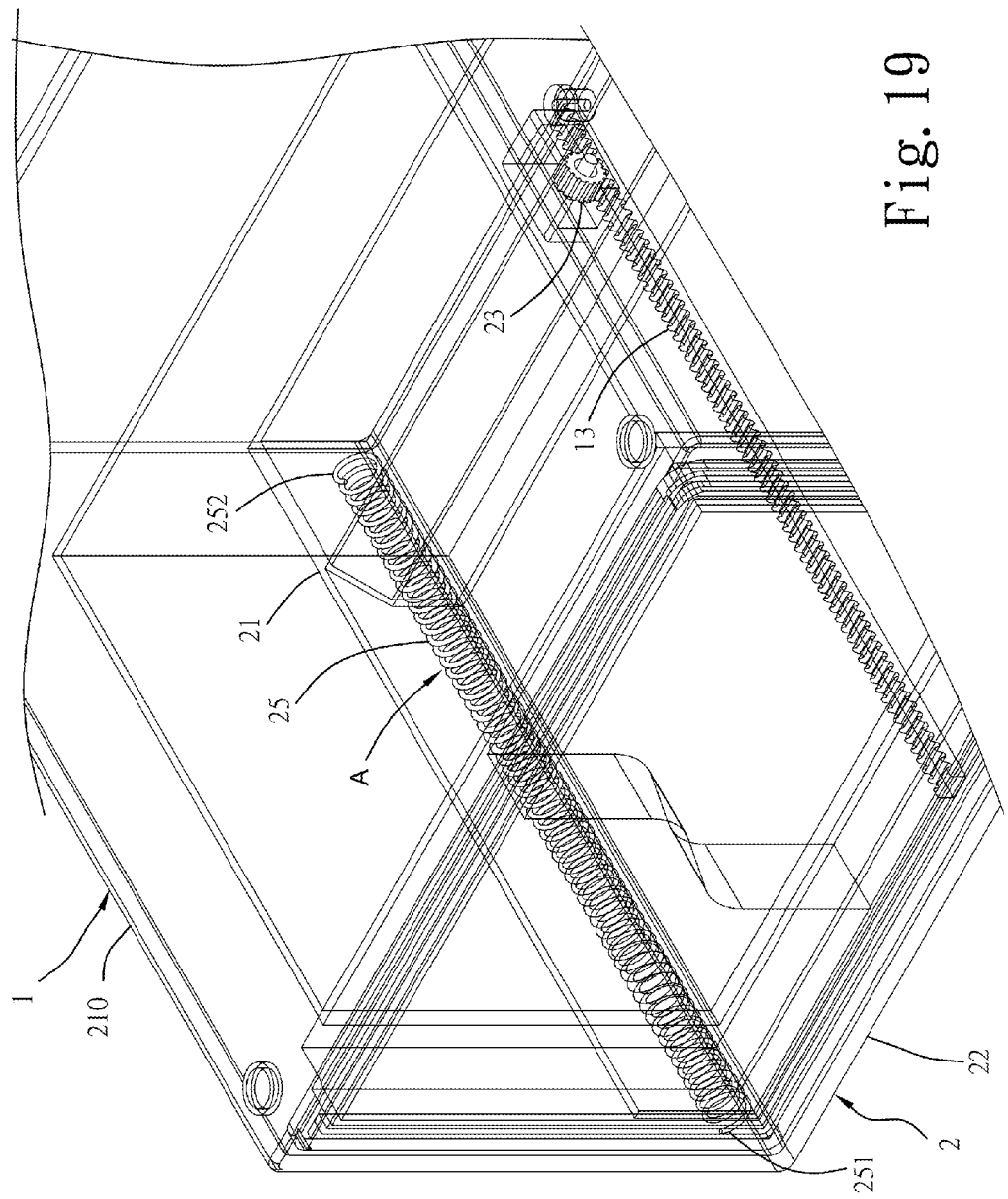
FIG. 19 corresponds to FIG. 16 but illustrating the drawer closed.
Figure 20:
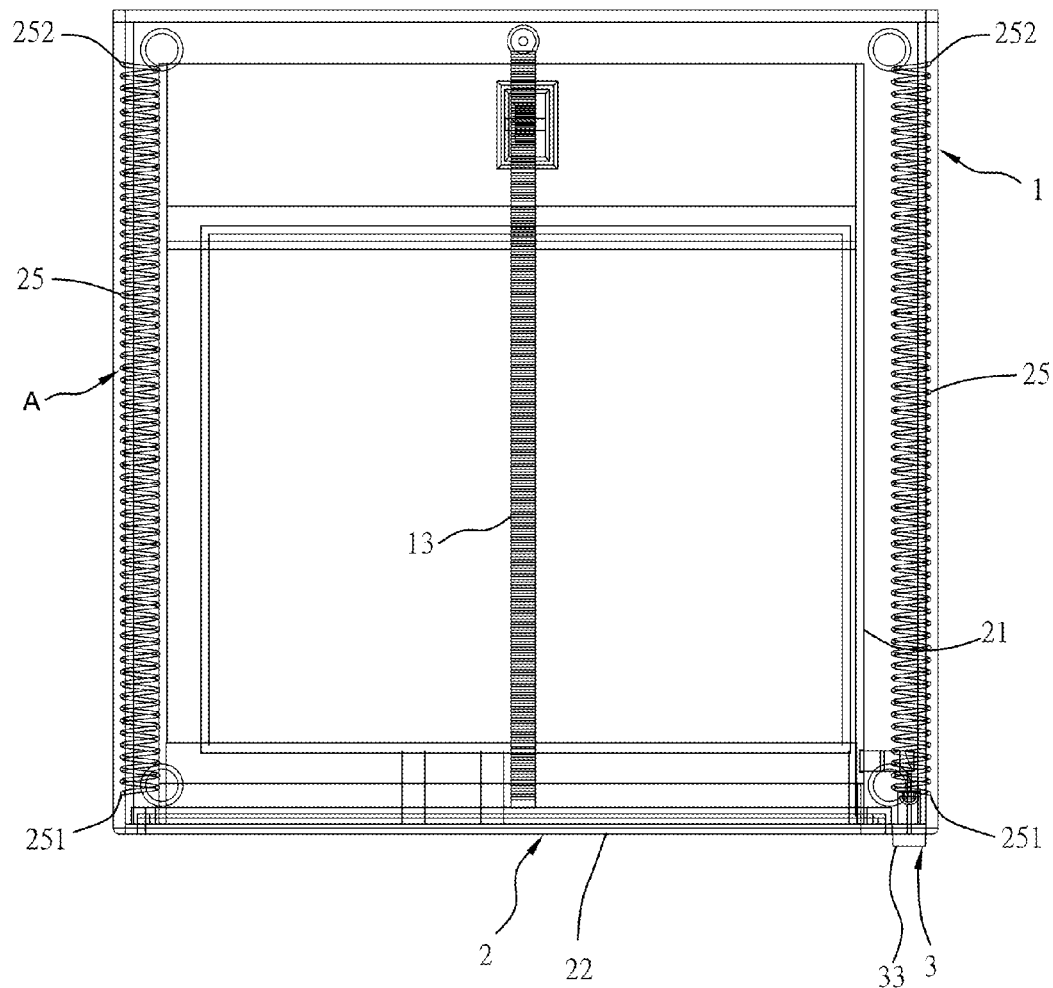
FIG. 20 is a schematic plain top view of FIG. 19.

Further, the opposite end 312 of the latch 31 of the operating member control mechanism 3 can be engaged into (see FIG. 5) or disengaged from (see FIG. 10) a latch groove 261 in the sidewall 26 of the drawer 2 (see FIG. 15).

Further, the aforesaid ejection mechanism A comprises a toothed bar 13 fixedly mounted in the container housing 1, a guide gear 23 pivotally mounted in a rear side of the drawer 2 (see FIGS. 6-9 and FIGS. 11-14) and meshed with the toothed bar 13, and an ejector clockwork 24 having one end thereof connected to the gear shaft of the guide gear 23 and an opposite end thereof connected to the rear side of the drawer 2. Thus, when the drawer 2 is pushed from the open position back to the closed position in the container housing 1, the guide gear 23 is rotated backwardly along the toothed bar 13 to wind up the ejector clockwork 24, restoring elastic potential energy for ejecting drawer 2 out of the container housing 1.

Further, in an alternate form of the ejection mechanism A as shown in FIGS. 16-20, two tensile springs 25 are used to substitute for the aforesaid ejector clockwork 24. The tensile springs 25 have respective one ends 251 thereof (see FIG. 18 and FIG. 19) respectively fastened to respective rear ends of two opposite lateral sides of the drawer body 21 of the drawer 2, and respective opposite ends 252 thereof (see FIG. 18 and FIG. 19) respectively bilaterally fastened to a rear inside wall of the container housing 1. Thus, when the drawer 2 is released from the operating member control mechanism 3, the spring force of the tensile springs 25 automatically eject the drawer 2 out of the container housing 1. Thus, this alternate form enables the drawer 2 to be automatically ejected out of the container housing 1 from the closed position to the open position. The arrangement of the guide gear 23 and the toothed bar 13 remains unchanged for guiding movement of the drawer 2 in and out of the container housing 1 accurately between the closed position and the open position.

Further, further a gasket ring 221 is mounted around the periphery of the door cover 22 of the drawer 2 (see FIGS. 2-4) so that the drawer 2 can be maintained airtight after having been put inside the container housing 1.

Further, the aforesaid transmission gear set 6 comprises a first pinion 61 (see FIG. 4 and FIG. 5) meshed with the drive gear 53, a first transmission gear 62 coaxially connected to the first pinion 61, a second pinion 63 meshed with the first transmission gear 62, a second transmission gear 64 coaxially connected to the second pinion 63, a third transmission gear 65 meshed with the second transmission gear 64, and a fourth transmission gear 66 meshed with the third transmission gear 65 and coaxially connected to the eccentric wheel 60.

The vacuum storage container further comprises an inner box 210 detachably mounted in the drawer body 21 of the drawer 2. Because the inner box 210 detachably mounted in the drawer body 21 of the drawer 2, it can be conveniently taken out of the drawer 2 for washing.

The operation of the vacuum storage container is outlined hereinafter. When the user rotates the rotary knob 51 through a predetermined number of turns, the clockwork 52 is wound up. As soon as the user releases the hand from the rotary knob 51, the drive gear 53 is forced by the clockwork 52 to rotate the transmission gear set 6, thereby reciprocating the pumping rod 71 and the pumping piston 72 several tends to several hundreds of times, and thus a vacuum is created in the vacuum storage container. When the internal pressure is in balance with the torque of the clockwork 52, a certain degree of vacuum is created in the container housing 1, and the clockwork 52 is maintained at a preloaded status, thus, in case of slight gas leaks, the preloaded pressure of the clockwork 52 and the transmission gear set 6 can maintain the internal vacuum. When compared with the conventional electronic type vacuum storage containers that need to start pumping again in case of a gas leakage or conventional mechanism vacuum storage containers that cannot pump air out automatically, the invention exhibits superior performances. When the user presses the operating head 331 of the operating member control mechanism 3, the actuation shank 332 is forced into the linking groove 313 of the latch 31 to move the latch 31, causing the opposite end 312 of the latch 31 (see FIG. 10) to be disengaged from the latch groove 261 in the sidewall 26 of the drawer 2. As soon as the latch 31 is disengaged from the latch groove 261, the drawer 2 is immediately ejected out by the ejection mechanism A from the closed position to the open position. Further, when the user pushes the drawer 2 backwardly toward the inside of the container housing 1, the gear shaft of the guide gear 23 of the ejection mechanism A will be rotated to wind up the ejector clockwork 24 (or the tensile springs 25 will be stretched to restore elastic potential energy). When the drawer 2 reaches the closed position, the latch groove 261 in the sidewall 26 of the drawer 2 is forced into engagement with the opposite end 312 of the latch 31 (see FIG. 15), and thus the drawer 2 is locked and will not be ejected out of the container housing 1 unless otherwise the operating head 331 of the operating member control mechanism 3 is pressed by a person. In the embodiment where the tensile springs 25 are used to substitute for the ejector clockwork 24, the tensile springs 25 will be stretched to restore elastic potential energy) if the drawer 2 is pushed back to the closed position and locked by the latch 31.

In conclusion, the invention provides a vacuum storage container, which has advantages and features as follows:

1. Through the functioning of the drive gear 53, the transmission gear set 6 and the clockwork 52, the invention achieves a high level of rotational conversion efficiency; by means of rotating the rotary knob 51 over a limited number of turns, the clockwork 52 is wound up, and the drive gear 53 will immediately drive the transmission gear set 6 to reciprocate the pumping rod 71 and the pumping piston 72 several tens to hundreds of times as soon as the user releases the hand from the rotary knob 51, and thus a vacuum can be rapidly created in the vacuum storage container.

2. When the internal pressure is in balance with the torque of the clockwork 52, a certain degree of vacuum is created in the container housing 1, and the clockwork 52 is maintained at a preloaded status, thus, in case of sligh gas leaks, the preloaded pressure of the clockwork 52 and the transmission gear set 6 can maintain the internal vacuum; thus, when compared with the conventional electronic type vacuum storage containers that need to start pumping again in case of a gas leakage or conventional mechanism vacuum storage containers that cannot pump air out automatically, the invention exhibits superior performances.

3. When the user presses the operating member control mechanism 3, the container housing 1 will discharge the pressure, and the drawer 2 will be immediately and automatically ejected out of the container housing 1 by the ejection mechanism A, and thus the invention has the characteristic of ease of use.

4. Any of a variety of different types of inner boxes 201 can be selectively and detachably placed in the drawer 2 for keeping things, and the loaded inner box 201 can be conveniently taken out of the container housing 1 for washing.

5. Multiple vacuum storage containers can be arranged in a stack or in multiple stacks for storing things in a vacuum condition.

What is claimed is:

1. A vacuum storage container, comprising:
a container housing;
a drawer mounted in said container housing and movable relative to said container housing between a closed position and an open position, said drawer comprising a drawer body slidably inserted into said container housing, a door cover located at a front side of said drawer body, a rotary knob pivotally mounted in an outer side of said door cover, said rotary knob comprising a center shaft inserted through said door cover, clockwork mounted in said door cover and arranged to be wound up by said center shaft of said rotary knob, a drive gear fixedly mounted on said center shaft of said rotary knob, a transmission gear set coupled to and rotatable by said drive gear, an eccentric wheel rotatable by said transmission gear set, and a pumping pump mounted in said door cover and coupled to said eccentric wheel, said pumping pump comprising a pumping rod eccentrically coupled to said eccentric wheel and a pumping piston pivotally connected to one end of said pumping rod opposite to said eccentric wheel and reciprocatable in said pumping pump for creating a vacuum in said container housing;

an ejection mechanism mounted in said container housing adapted for ejecting said drawer out of said container housing from said closed position to said open position; and
an operating member control mechanism mounted in said container housing and adapted for locking said drawer to said container housing in said closed position and operable by a person to unlock said drawer from said closed position.

2. The vacuum storage container as claimed in claim 1, wherein said operating member control mechanism comprises a latch, a spring member and an operating member, said latch being movably mounted in an accommodation chamber inside said container housing and having one end thereof stopped against said spring member and an opposite end thereof movable in and out of said accommodation chamber to lock or unlock said drawer, said latch comprising a linking groove coupled to and movable by said operating member, said spring member being mounted in said accommodation chamber of said container housing with one end thereof stopped against said latch to impart a pressure to said latch and an opposite end stopped against an inside wall of said container housing, said operating member being movably mounted in a locating groove at a front side of said container housing, said operating member comprising an operating head and an actuation shank backwardly extended from said operating head, said operating member being pressable by a person to move said actuation shank into said linking groove of said latch to move said latch away from said drawer.

3. The vacuum storage container as claimed in claim 2, wherein said drawer comprises a latch groove located in one sidewall thereof for the engagement of said latch for enabling said drawer to be locked to said container housing in said closed position.

4. The vacuum storage container as claimed in claim 1, wherein said ejection mechanism comprises a toothed bar fixedly mounted in said container housing, a guide gear pivotally mounted in a rear side of said drawer and meshed with said tooth bar, and an ejector clockwork, said ejector clockwork having one end thereof connected to said guide gear and an opposite end thereof connected to said drawer.

5. The vacuum storage container as claimed in claim 1, wherein said ejection mechanism comprises a toothed bar fixedly mounted in said container housing, a guide gear pivotally mounted in a rear side of said drawer and meshed with said tooth bar, and two tensile springs, each said tensile spring having one end thereof connected to said drawer body of said drawer and an opposite end thereof connected to said container housing.

6. The vacuum storage container as claimed in claim 1, wherein said drawer further comprises a gasket ring mounted around the periphery of said door cover.

7. The vacuum storage container as claimed in claim 1, wherein said transmission gear set comprises a first pinion meshed with said drive gear, a first transmission gear coaxially connected to said first pinion, a second pinion meshed with said first transmission gear, a second transmission gear coaxially connected to said second pinion, a third transmission gear meshed with said second transmission gear, and a fourth transmission gear meshed with said third transmission gear and coaxially connected to said eccentric wheel.

8. The vacuum storage container as claimed in claim 1, further comprising at least one inner box detachably mounted in said drawer body of said drawer.

* * * * *